United States Patent [19]

Tomizawa et al.

[11] 4,395,023
[45] Jul. 26, 1983

[54] SHROUD FOR STEEL MAKING ELECTRIC-ARC FURNACE

[75] Inventors: Fumio Tomizawa; Katsutoshi Sobata, both of Yokohama; Yoshiaki Yoshimatsu, Kure; Sadayuki Saito, Yotsukaido; Takashi Otani; Senzaburo Hirano, both of Chiba, all of Japan

[73] Assignees: Ishikawajima-Harima Jukogyo Kabushiki Kaisha; Kawasaki Seitetsu Kabushiki Kaisha, both of Japan

[21] Appl. No.: 388,154

[22] Filed: Jun. 14, 1982

[30] Foreign Application Priority Data

Sep. 22, 1981 [JP] Japan .................................. 56-149808
Sep. 22, 1981 [JP] Japan .................................. 56-149809

[51] Int. Cl.³ ............................................. H05B 7/20
[52] U.S. Cl. .................................. 266/158; 266/142; 373/8; 373/81
[58] Field of Search ............... 266/143, 157, 158, 142, 266/144, 100, 159; 13/1, 9 R; 98/115 R, 115 VM, 115 LH; 373/8, 9, 81

[56] References Cited

U.S. PATENT DOCUMENTS

| 3,149,191 | 9/1964 | McFeaters et al. | 266/142 |
| 3,772,448 | 11/1973 | Bowermaster et al. | 266/159 |
| 3,913,898 | 10/1975 | Wolters | 266/158 |
| 3,938,788 | 2/1976 | Josten | 266/142 |
| 4,088,824 | 5/1978 | Bonistalli | 373/9 |
| 4,089,640 | 5/1978 | Overmyer et al. | 266/158 |
| 4,160,117 | 7/1979 | Schempp | 373/9 |

FOREIGN PATENT DOCUMENTS

| 3357 | 8/1979 | European Pat. Off. | 266/158 |
| 49-117539 | 10/1974 | Japan | |

Primary Examiner—L. Dewayne Rutledge
Assistant Examiner—Scott Kastler

[57] ABSTRACT

This invention relates to a shroud for a steel making electric-arc furnace which surrounds the electric-arc furnace main body for sound- and dust-proofing, having doors provided in the side wall of the shroud to permit the scrap bucket to move in and out of the shroud and an opening of a minimum width in the suction port of a dust collecting suction duct on the top wall to permit transverse movement of the bucket lifting means to the center of the electric-arc furnace main body.

6 Claims, 24 Drawing Figures

SHROUD FOR STEEL MAKING ELECTRIC-ARC FURNACE

BACKGROUND OF THE INVENTION

Conventionally, in order to minimize dissipation and emission of noise, dust and exhaust gas produced in operation of a steel making electric-arc furnace into atmosphere, a measure is taken to surround the electric-arc furnace wholly with sound insulating and dust-proof panels and thus form a shroud. In the following will now be described the conventional shrouds and the problems involved in such shrouds briefly.

In FIGS. 1 and 2 is shown a conventional shroud 1 as Case 1. In this example, the electric-arc furnace main body 2 is surrounded by a sound insulating wall 3. At the top of this insulating wall 3 are provided rails 4 which are adapted for a truck type sound insulating cover 5 to move thereon. On the top sound insulating cover 5 is fitted a dust collecting elbow 6 which is connected to a dust collector (not shown). Further, a sand seal or other sealing device 8 is provided between the lower end of the side edge 7 of the top sound insulating cover 5 and the top of the sound insulating wall 3. The shroud of such system is disadvantageous in that when the top sound insulating cover 5 is moved, the dust collecting elbow 6 moves together with the top sound insulating cover 5 to a position shown by solid lines and thus separates from a fixed duct 9, making it difficult to collect dust within the shroud. For example, when scraps 11 are charged into the electric-arc furnace with the top sound insulating cover 5 opened and a scrap bucket 10 is introduced into the shroud, the generated dust and gas flow as shown by arrow a into atmosphere through the opening at the top of the shroud.

In FIGS. 3 and 4 is shown another type of the conventional shroud as Case 2. In this example, the shroud 1 surrounding the electric-arc furnace 2 has a dust collecting duct 12 provided at the top and an opening extending on a side wall 13 and a top wall 14, said opening having a width enough to introduce a scrap bucket (not shown) into the shroud 1. A semi-portal door 15 for covering the opening is provided so as to be movable sideward to a position shown by two-dot chain line in FIG. 4. The shroud of this system has said semi-portal door 15 kept opened when scraps are introduced into the furnace so that generated dust and exhaust gas are dissipated into atmosphere through the opening in the top of the shroud 1.

FIG. 5 shows a still another type of the conventional shroud as Case 3. In this case, the shroud 1 surrounding the electric-arc furnace main body 2 has a dust collecting device 16 provided at the upper part, an opening on the side wall 13 for introduction of the scrap bucket and doors 15' covering said opening, and another opening 18 in the top wall 14 for passage of a rope 17 suspending said bucket and a panel 19 to open or close said opening 18. Further, near said opening 18, an air curtain device 20 is provided to take, when said panel 19 is opened, the flow of exhaust gas generated in the direction of arrow a from the furnace when scraps are charged in the direction of arrow c, discharge the same in the direction of arrow d and deflect it along a tilted flange 21 to the inlet port 22 of the dust collecting device 16. This system has a good efficiency of discharge of the exhaust gas in that the air curtain device 20 does not take in the external air. But, the exhaust gas generated at the time of oxygen blow is of high temperature. Further, when the furnace cover is opened for additional charge of scraps, the upper part of the shroud is exposed to a very high temperature of the heat of radiation of the molten metal in the electric-arc furnace. Accordingly, it is required to take measures for prevention of damage due to dielectric breakdown and thermal deformation of the motor and fan of the air curtain device 20. Further, because of intake of the exhaust gas containing dust in a great quantity, the fan impeller is subject to wear, resulting in unbalanced vibration and in turn damage to the fan.

In FIGS. 6 and 7 is shown a further conventional shroud as Case 4. In this case, the shroud 1 surrounding the electric-arc furnace 2 is provided at the upper part thereof a suction port 22 which is connected to a dust collecting device, an opening extending on the side wall 13 and the top wall 14 for introduction of a scrap bucket (not shown), and two semi-portal doors 15 covering said openings respectively and being adapted to move sideward to positions shown by two-dot chain line in FIG. 7. Further, there are provided, at the top of each door 15, a spacing 24 allowing to pass a scrap bucket suspending rope (not shown) when the door 15 is closed, and an air curtain device 20 to seal said spacing 24 and thus allow air to flow in the direction of arrow d across the spacing 24. Primarily, the air curtain should operate only for several minutes during which scraps are charged. But, according to this system, the spacing 24 allowing to pass the rope is kept open during the process of smelting when the furnace cover 25 and doors 15 are closed so that it is required to operate the air curtain constantly, and such is useless. Further, in order to seal the exhaust gas produced in a great quantity when scraps are charged additionally, the air curtain of the air push system fails to provide a satisfactory effect.

The present invention is intended to provide a shroud of steel making electric-arc furnace which solves the problems in the above-mentioned conventional shrouds and is capable of reducing the dissipation into atmosphere of the exhaust gas at the time of scrap charging to minimum and prevent dissipation of the exhaust gas in operation of the furnace without any particular powered air curtain device provided.

The present invention will now be described in details with reference to embodiments represented in the accompanying drawings.

DETAILED DESCRIPTION OF THE PREFERRED EMBODIMENTS

Now, the present invention will be described particularly with reference to the first embodiment shown in FIGS. 8 through 10.

Figure 1:
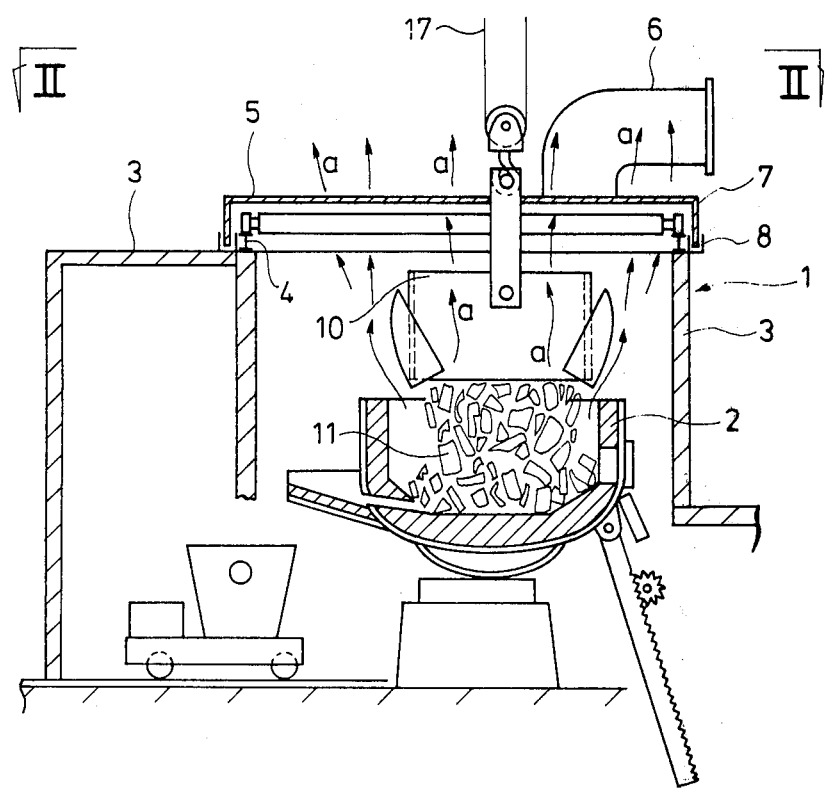
FIG. 1 is a cross-sectional side view showing the conventional steel making electric-arc furnace shroud Case 1.
Figure 2:
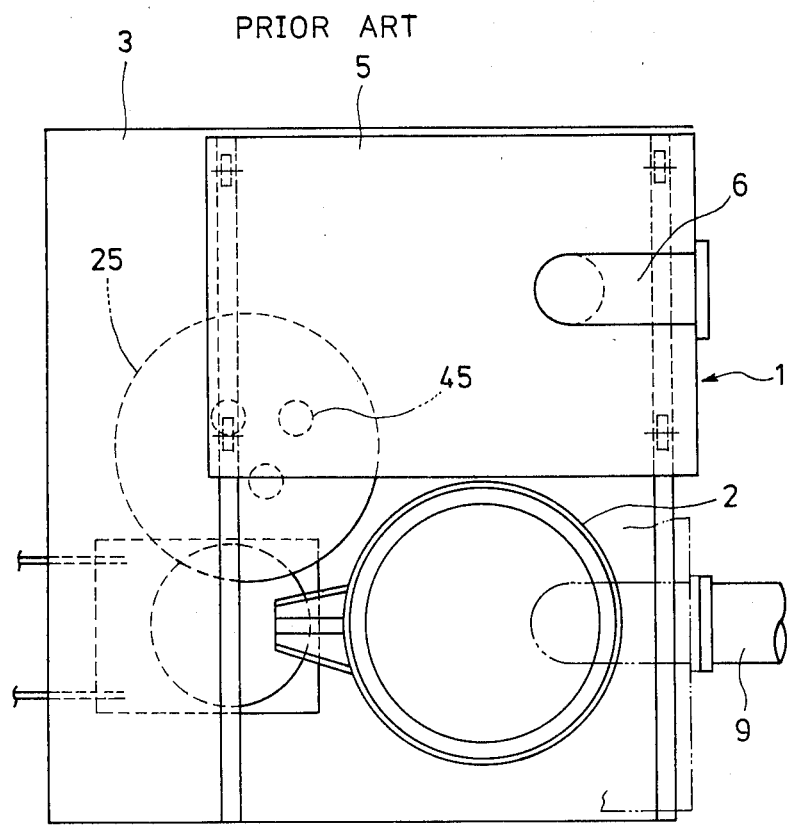
FIG. 2 is a plan view looking in the direction of the arrows II—II in FIG. 1.
Figure 3:
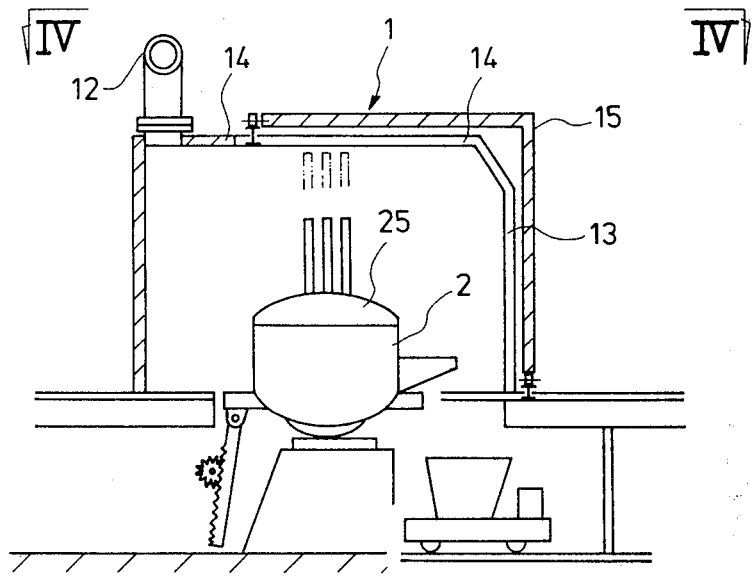
FIG. 3 is a sectional side view of Case 2.
Figure 4:
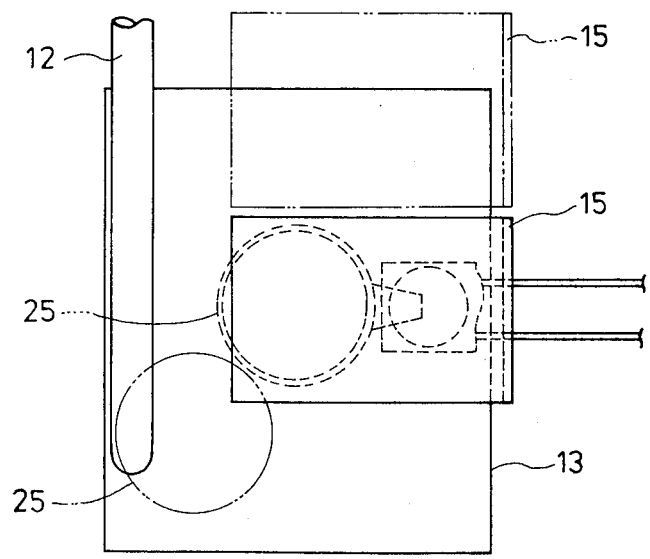
FIG. 4 is a plan view looking in the direction of the arrows IV—IV in FIG. 3.
Figure 5:
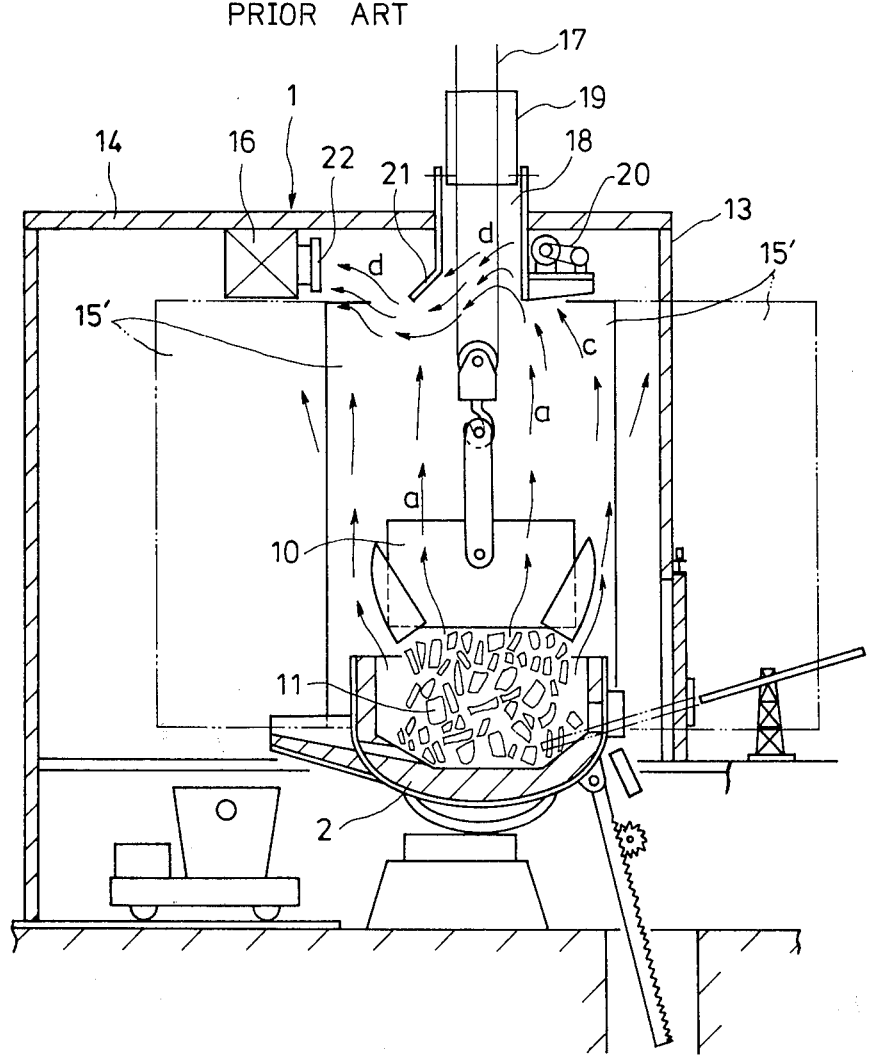
FIG. 5 is a sectional side view of Case 3.
Figure 6:
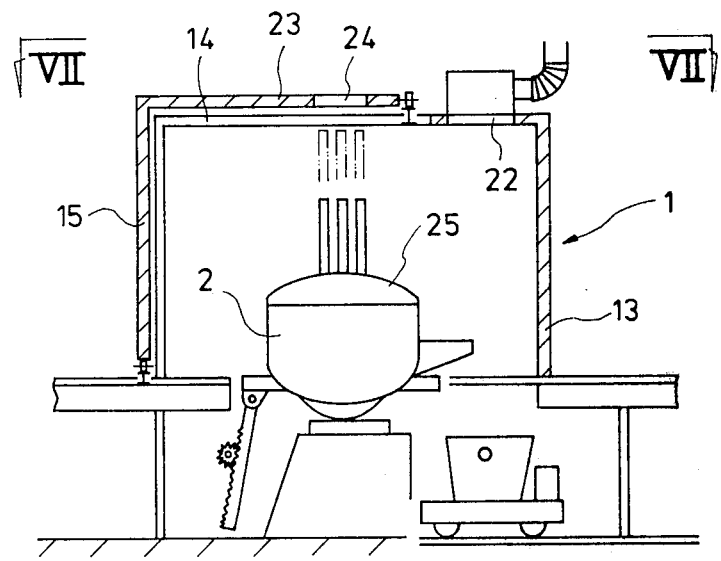
FIG. 6 is a sectional side view of Case 4.
Figure 7:
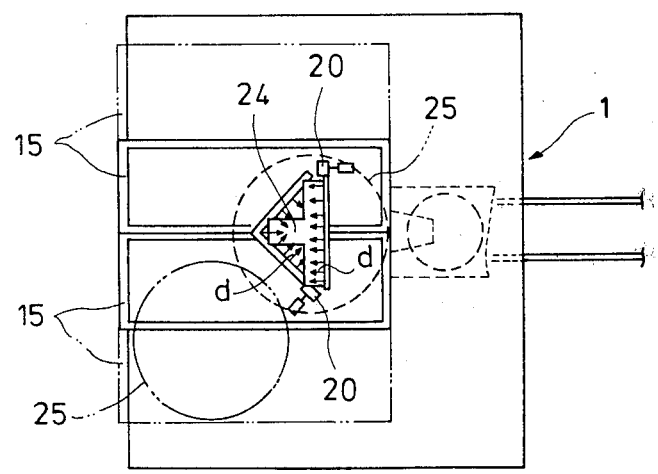
FIG. 7 is a plan view looking in the direction of the arrows VII—VII in FIG. 6.
Figure 8:
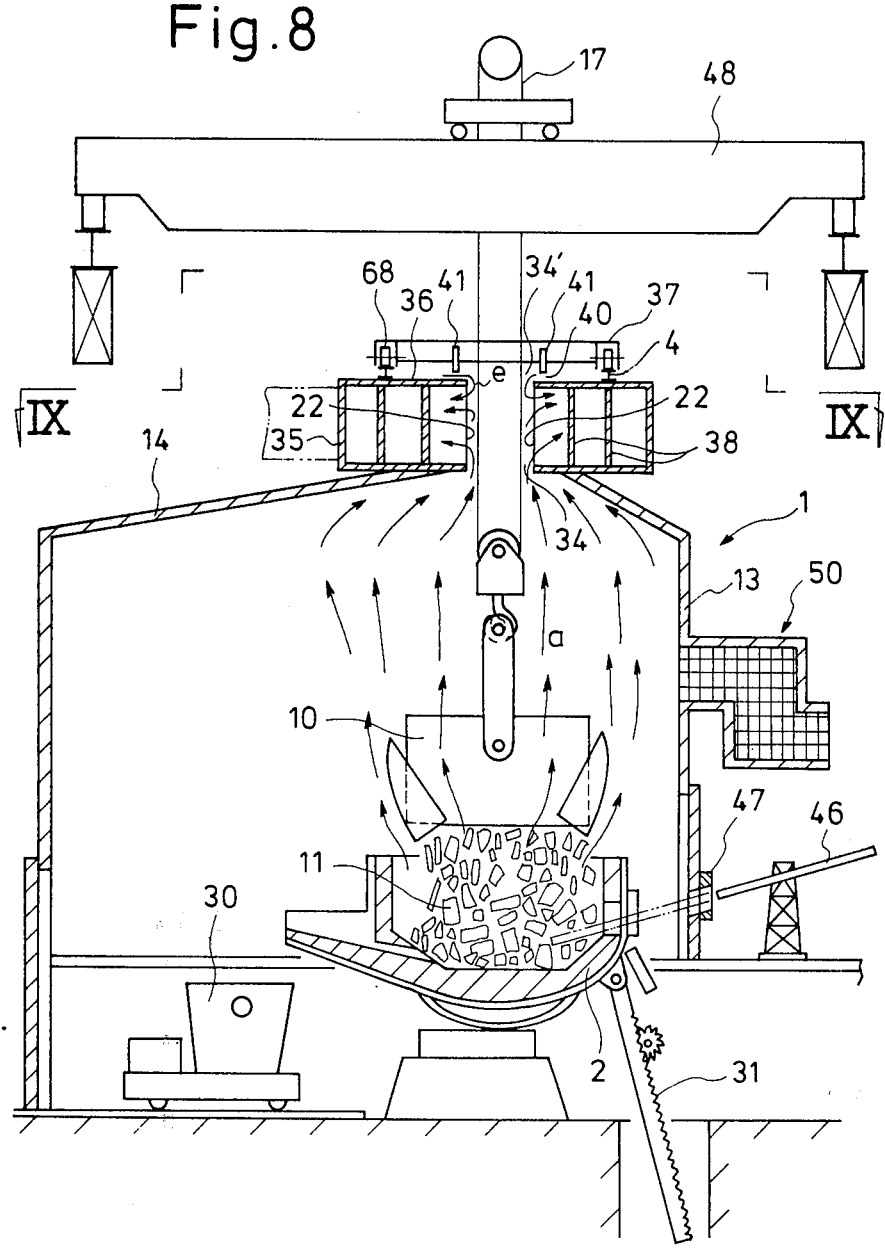
FIG. 8 is a sectional side view of a first embodiment of the steel making electric-arc furnace shroud according to the present invention.
Figure 9:
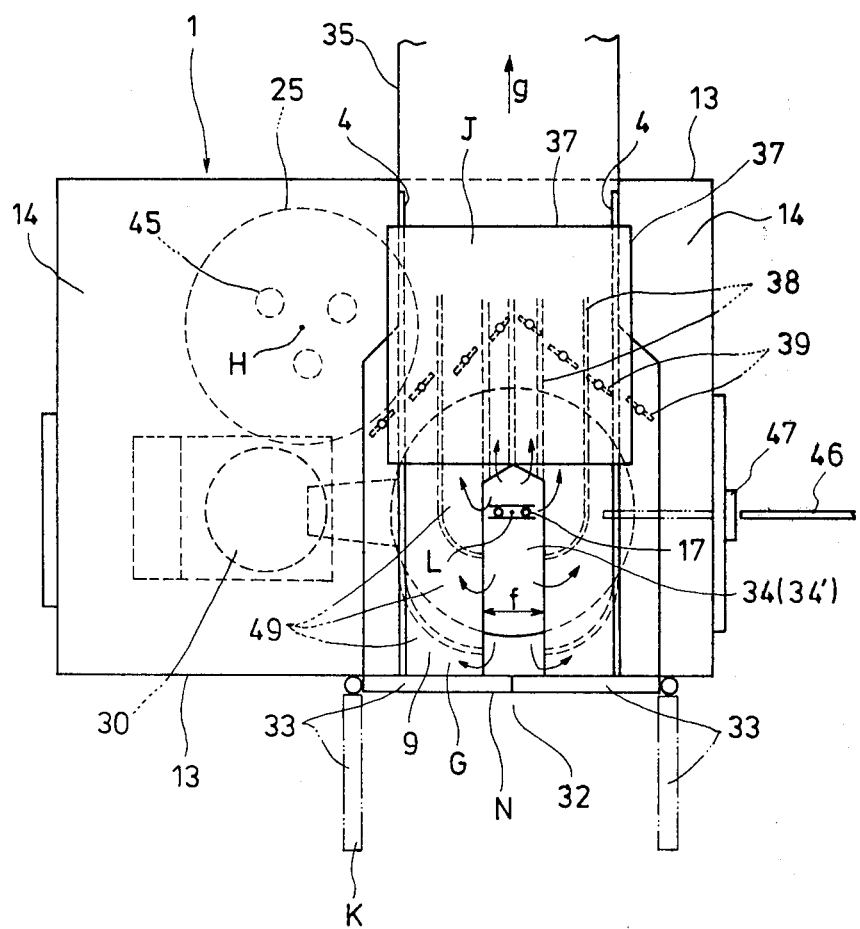
FIG. 9 is a plan view looking in the direction of the arrows IX—IX in FIG. 8.
Figure 10:
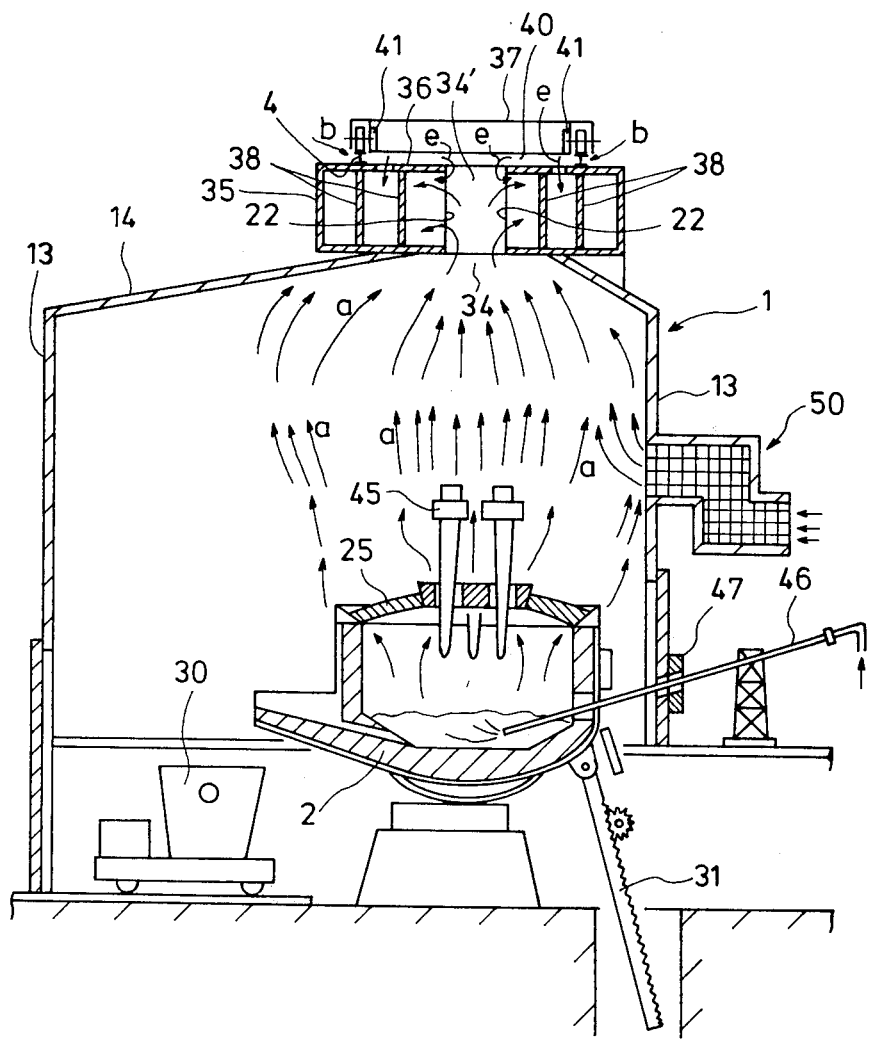
FIG. 10 is a sectional side view of the shroud shown in FIG. 8, with the furnace cover closed.
Figure 11:
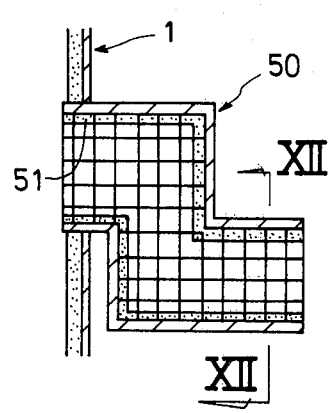
FIG. 11 is a detailed diagram of the air inlet port shown in FIG. 8.
Figure 12:
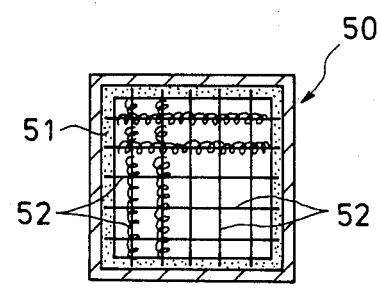
FIG. 12 is another diagram of the air inlet port taken along the lines XII—XII in FIG. 11.

In FIGS. 8 through 10, reference numeral 2 represents an electric-arc furnace main body; 30, a ladle; 31, a tilting device; 10, a scrap bucket; and 17, a suspending rope. A shroud 1 surrounding the electric-arc furnace main body 2 is formed by a sound- and dust-proof side wall 13 and a sound- and dust-proof top wall 14. In the side wall 13, there is provided an opening 32 enough to allow the scrap bucket 10 suspended by the suspending rope 17 of a scrap charging crane 48 to pass through the side wall 13 when scraps 11 are charged, and also doors 33 adapted to open or close said opening 32. The door 33 may be of either hinged or slide type. Further, in the top wall 14 is provided a slit 34 so that when the scraps are charged, the suspending rope 17 can be moved laterally to the center of the arc furnace main body 2. The width f of the slit 34 should be of a minimum size enough for the suspension rope 17 to be moved laterally with a minimum leak of exhaust gas generated at the time of scrap charging. Further, the shroud 1 has an air inlet 50 provided, said air inlet port being so composed as to be of sound absorbing and insulating structure, suppressing leak of noise to the outside to minimum, and of less resistance to air flow through the air inlet 50. Describing an air inlet 50 in detail with reference to FIGS. 11 and 12, it has a zigzag passage as a whole so that sound waves reflect repeatedly, while it has a sound absorbing material pasted on the inner wall surface of the passage and rods wrapped with a sound absorbing material disposed in the passage at an adequate spacing in the form of a cubic lattice to absorb and insulate sound and, at the same time, reduce the resistance to air flow to minimum as a passage of air inflow.

However, the air inlet 50 of sound absorbing and insulating structure is not limited to that illustrated. It may be designed according to the conventional silencer or the like and may take whatever form and structure. Further, the air inlet 50 can be located at any desired position and be installed in a desired number and may be in the form of a window or slit.

The noise of the steel making furnaces is composed, for the greater part, of sound components belonging to a relatively low frequency band so that by designing a resonant sound absorbing part utilizing the Helmholtz effect in the passage, it is enabled to design an air inlet of a shape giving a very great sound absorbing and insulating effect. For this air inlet, a normally used sound absorbing material such as glass wool or rock woll is usable.

It is optional to apply a lining of acoustic material 51 onto the inner surface of the shroud 1 to suppress the level of acoustic pressure or to construct the wall of the shroud 1 in a double structure to increase the sound transmission loss and thus insulate the sound.

On the top wall 14 is provided a top suction duct 35 for collection of dust to cover said opening 34, said top suction duct having a rectangular cross-section and being connected to a dust collecting device (not shown), and in the upper part 36 of said suction duct 35 is provided an opening 34' of the same shape with the opening 34 to permit transverse movement of the suspending rope 17. Further, in the upper part 36 of the suction duct 35, a top door 37 is provided which is adapted to move along rails 4 to open or close said opening 34'.

The suction duct 35 has suction ports 22 opened in a lateral direction so as to be connected to the upper and lower openings 34 and 34', as shown, and is divided in a longitudinal direction by an appropriate number of guide plates 38 so that it exhibits a uniform suction force around the openings. In each channel 49 thus divided, a flow adjusting damper 39 is provided so that the pattern of flow of the exhaust gas in the shroud can be adjusted.

Figure 13:
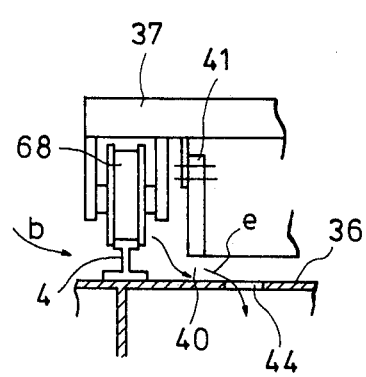
FIG. 13 is an enlarged side view showing the part of the spacing adjustment plate for the top door in FIG. 8.
Figure 14:
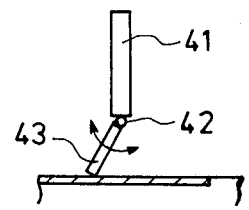
FIG. 14 is a side view showing another embodiment of the spacing adjustment plate in FIG. 13.

The top door 37 has also fitted thereto clearance adjusting plates 40 which protrude downward to form a clearance 40 with the upper part 36 of the suction duct 35. The clearance adjusting plates 41 are so disposed in the top door 37 that when the top door is moved to a closing position G, they will surround the opening 34' at a position as close to the periphery of the opening 34' in the upper part of the suction duct as possible. Said clearance 40 is preferably as small as practicable in order to prevent leakage of the exhaust gas, and for example, a freely rotatable fin 43 may be provided around a hinge 42 at the lower part of each clearance adjusting plate, as shown in FIG. 14. Said clearance 40 serves for the atmospheric air to be drawn in the direction of arrow b by the suction of the dust collecting device. Further, as shown in FIG. 13, a suction slit 44 may be provided close to an inside of the clearance adjusting plate 41 to draw air in the direction e.

Now the operation and function of the shroud 1 will be described in each of the cases of charging scraps and operating the furnace.

At the time of scrap charging, the furnace cover 25 and the electrodes 45 are turned to the position H as shown in FIG. 9, and the top door 37 and the swing doors 33 are moved to the open positions J and K respectively. Then, the scrap bucket 10 suspended by the rope 17 is moved laterally, using a crane (not shown), to pass through the side wall 13 to a position immediately above the arc furnace main body 2, when the scraps 11 are charged into the furnace, with the swing doors 33 closed. The exhaust gas here generated rises up immediately above the furnace in the direction of arrow a and is drawn out of the suction ports 22 communicated with the opening 34, while atmospheric air is drawn in through the opening 34' at the upper part of the suction duct, so that there is little leak of the gas from the shroud and thus that dissipation of the gas into atmosphere is prevented.

The operation and function of the shroud 1 at the time of operation of the arc furnace will now be described. Once the scraps are charged into the arc furnace main body 2, the scrap bucket 10 is lifted up by the rope 17 and is carried out of the shroud 1 through the swing doors 33. Then, the furnace cover 25 and the electrodes 45 are turned from the retreat position H to the work position L, and the swing doors 33 are moved from the open position K to the closed position N, and the top door 37 from the open position J to the closed position G, to close all of the openings of the shroud 1. Then, the arc furnace is adapted for electrification. The oxygen lance 46 for oxygen blowing is inserted through a small window 47 in the side wall 13.

As shown in FIGS. 9, 10 and 13, the exhaust gas generated in a great quantity at the time of operation or, more particularly, oxygen blowing, rises up by draft in the direction of arrow a to the upper part of the shroud where it enters together with air coming from the air inlet 50 into the suction duct 35 through the suction ports 22 and flows in the direction of arrow g toward the dust collecting device (not shown). At this time, the clearance 40 between the top door 37 and the upper part 36 of the suction duct is in the vicinity of the opening 34' so that atmospheric air flows through the spacing between the rails 4 and the wheels 68 and further through the clearance 40 beneath the clearance adjusting plates 41 as shown by arrow e, and is drawn into the suction ports 22. Thus, leak of the exhaust gas into atmosphere is prevented. As stated above, a large quantity of exhaust gas generated in operation or, more particularly, in oxygen blowing may stay temporarily at the upper part of the shroud but is drawn immediately through the suction ports 22 and the suction duct 35 to the dust collecting device so that dissipation of the exhaust gas into atmosphere can be prevented. Further, by reducing the clearance 40, it is enabled to decrease the amount of air to be drawn in. But, even if the clearance may be large, the volume of air to be drawn in only increases and so much volume of air to be drawn in through the air inlet 50 decreases, so that the effect of the present invention is not at all affected.

Now, in said first embodiment, no particular consideration is given to the maintenance in the furnace. In the second embodiment shown in FIGS. 15 through 18, it is designed so that the maintenance of the equipments housed in the sound- and dust-proof shroud can be made with ease and promptly for improvement of the productivity of the arc furnace.

For the sake of prompt maintenance of the arc furnace main body 2 and related equipments, there are installed a top maintenance crane 53, a spout maintenance crane 54, an electrode splicer 55 and a hot furnace repairing device 56 in the shroud 1.

Figure 15:
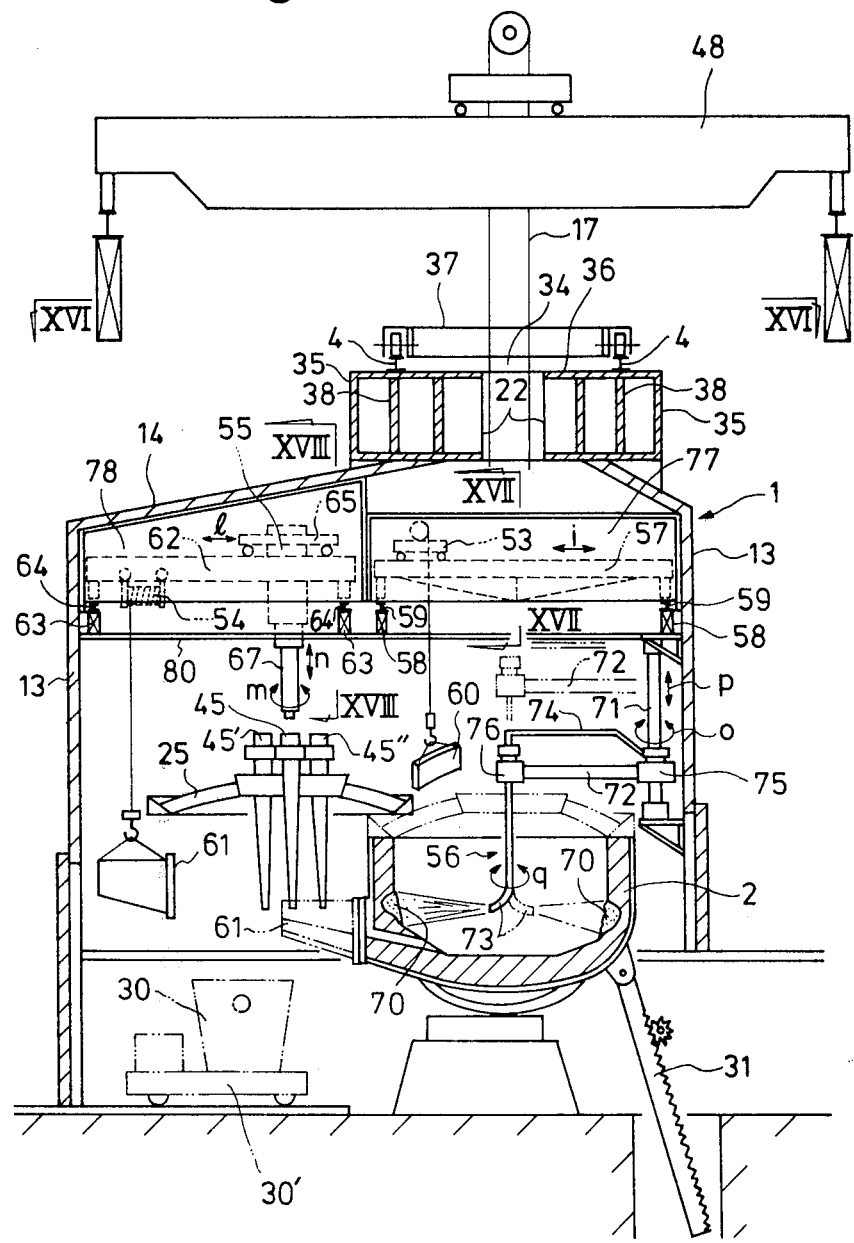
FIG. 15 is a sectional side view of a second embodiment of the steel making electric-arc furnace shroud of the present invention.
Figure 16:
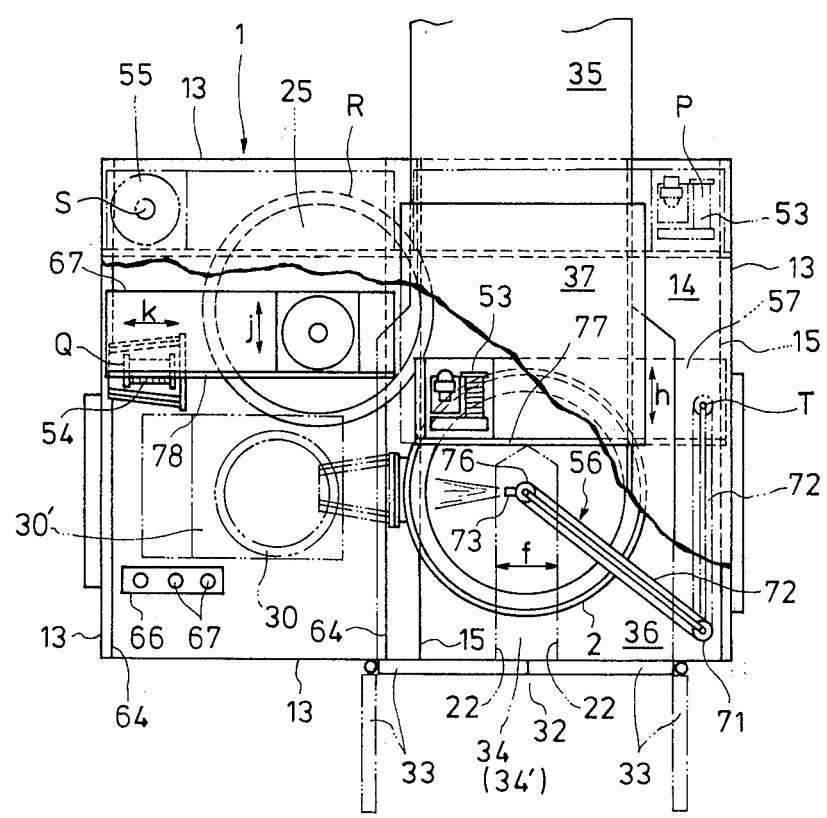
FIG. 16 is a plan view looking in the direction of the arrows XVI—XVI in FIG. 15.

The top maintenance crane 53 is intended for all maintenance on the side of the arc furnace in the shroud, as will be described later, and it travels transversally in a direction of arrow i over a top girder 57 which travels close to the top wall 14 at the upper part of the arc furnace main body 2 in a direction of arrow h, as shown. Said top girder 57 travels on rails 59 mounted on beams 58 extended between the side walls 13 of the shroud 1. The top maintenance crane 53 is used, in place of the scrap charging crane 48 disposed normally outside of the shroud 1, for works with the suspending rope dropped through a spacing created by removing the top wall or through the top door opening opened widely and is adapted for the maintenance of the arc furnace such as, for example, inspection, adjustment, repair and change of the water cooled cable, circular bus line, electrode holder, insulators, water cooled panel, motor, reduction gears and hydraulic equipment, to be carried out in a short time and with ease. In FIG. 15 is shown the top maintenance crane 53 lifting a water cooled panel 60. During the operation, the top maintenance crane 53 is recessed to a position P where it is least affected by heat of high temperature and pollutant gas generated from the arc furnace main body 2.

The spout maintenance crane 54 is intended for all maintenance on the spouting side, including repair and change of the spout 61 and ladle carrier 30'. It travels transversally in a direction of arrow k over a girder 62 on the spouting side which moves close to the top wall 14 at the upper part of the spacing on the spouting side in a direction of arrow j, as shown, and said spouting girder 62 travels on rails 64 mounted on beams 63 extended between the side walls 13 of the shroud. During the operation of the arc furnace, the spout maintenance crane 54 is recessed to a position Q for the same reason for the top maintenance crane 53.

As shown, the beams 58 of the top girder 57 and the beams 63 of the spout girder 62 are disposed alongside with and in parallel to each other so that by means of the top maintenance crane 53 and spout maintenance crane 54, all of the equipments disposed in the shroud can be lifted.

The side walls 13 which bear the load of the beams 58 and 63 are reinforced appropriately. Further, the adjacent beams 58 and 63 may be integrated into one beam having a required strength.

The electrode splicer 55 is mounted on a trolley 65 traversing in a direction l over said spouting girder 62. It takes an electrode 67 out of an electrode storage space 66 in the shroud and carries it to immediately above the electrode 45, 45' or 45" in the furnace cover 25 at a released position R. Then after automatic centering, applies a rotary movement in the direction of arrow m as well as a feed movement in the direction of arrow n to the electrode 67 and screws to automatically splice the electrode 67 to the electrode 45, 45' or 45". During the operation of the arc furnace, the electrode splicer 55 is recessed to a position S.

The operation to remove the furnace cover 25 from the arc furnace main body 2 and move it to the released position R is made by a furnace cover slewing device (not shown).

The hot furnace repair device 56 is intended to repair the inner wall surface of the arc furnace by spraying a refractory in the form of a slurry or dry powder onto a damaged part 70, and it comprises a post 71 fitted to the side wall 13 of the shroud, a slewing arm 72, a spraying nozzle 73 and a tube 74. At the lower part of the post 71 is provided a sector gear (not shown), and by turning the post 71 in a direction of arrow o by drive means (not shown), it is enabled to raise or lower the slewing arm 72 in a direction of arrow p across a pinion provided inside the fitting part 75 of the slewing arm 72. The spraying nozzle 73 is mounted rotatably in a direction of arrow q to an extreme end part 76 of the slewing arm 72. Thus, maintenance can be carried out in parallel with the electrode splicing work immediately after spouting and heavy labor is no longer required. The hot repairing device 56 has its slewing arm 72 turned and elevated to a position shown by two dot chain line after completion of the repair and is recessed to a position T during the furnace operation.

Figure 17:
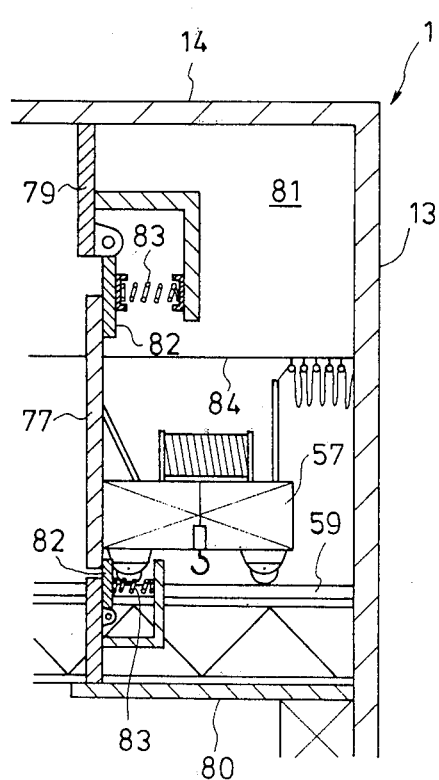
FIG. 17 is a sectional view taken along the lines XVII—XVII in FIG. 15.
Figure 18:
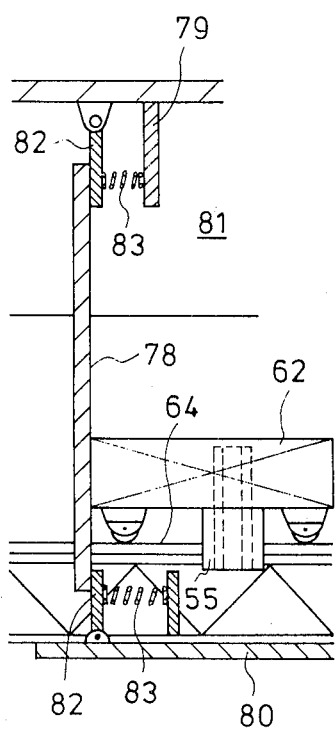
FIG. 18 is a sectional view taken along the line XVIII—XVIII in FIG. 15.

In front of the top girder 57, there is provided a closure 77 to protect the top maintenance crane 53 from the heat and dust produced from the arc furnace main body 2, and a similar closure 78 provided in front of the spout girder 62 to protect the spout maintenance crane 54 and electrode splicer 55 from heat and dust. Further, as shown in FIGS. 17 and 18, there is provided, at one of travelling ends of the top girder 57 and spout girder 62 respectively, a protective space 81 housed by heat insulating plates 79 and 80 which are fixed except the opening of inlet or outlet of the girder to protect the cranes and electrode splicer from heat and dust. The closure 77 and 78 and heat insulating plates 79 and 80 are of heat insulating structure, but they may be further sound proofed, as desired. The closures 77 and 78 are adapted to move together with the girders 57 and 62 respectively so that they are constructed in as small a size and a weight as practicable so far as their function is not hindered to reduce the increase of crane load to minimum and prevent deformation of the beams. The shape and structure of the closures 77 and 78 and the method of fixing to the girders are not limited particularly so long as the minimum opening required for inlet and outlet of the crane is closed tightly.

When the top girder 57 or the spout girder 62 enters said protective space 81, the crane itself closes the opening across the closures 77 and 78 so that any door, screen or any other devide which is opened to let the crane in or out but is closed normally is not required.

Along the periphery of the opening is provided a seal mechanism which seals the peripheries of the closures 77 and 78 as the crane closes the opening by itself. In FIGS. 17 and 18 is shown the seal mechanism provided at a proper position for example on the heat insulating plate 79 and comprises a rocking buffer seal plate 82 and a spring 83. This seal mechanism can be constructed in any desired form so long as the peripheries of the closures 77 and 78 are sealed properly even if there is an error in the position of stop of the girder. In place of the spring, there may be used a rocking plate using a weight, a movable body utilizing an oil pressure or electro-magnetic force, an air bag or highly foamed expandable resinous body, a flexible pliable plate or a screen, provided such has a heat resesting property and durability.

If those parts which are not closed by the closures 77 and 78 such as, for example, gaps at the parts of the rails 59 and 64 and the opening allowing the cable tension rope 84 to pass are cut off by an air curtain system or the like, heat insulation and dust proofness are further improved.

The top maintenance crane 53, spout maintenance crane 54 and electrode splicer 55 are protected by the protective space 81 from high temperature gas and dust, and degradation of such equipments and material is prevented.

As has been described in the foregoing, the top maintenance crane 53 and spout maintenance crane 54 are adapted to traverse along the different girders respectively. But, these cranes 53 and 54 may be so designed as to traverse along a single common girder together with said electrode splicer 55. Further, in place of the top maintenance crane 53 and spout maintenance crane 54, a single common crane may be used, and in such case, the girder may be allowed to travel in a direction perpendicular to that illustrated.

Further, in this embodiment, the cranes are stored in the protective space when they are not used. But, the equipments may be made heat resistant and dust proof, and the protective space may be omitted.

As stated above, the top maintenance crane and the spout maintenance crane perform all of the releasing and repairing works for inspection and repair of the arc furnace and related devices and permit movement to specified positions so that the inspection and repair works can be carried out concurrently at the respective positions in the shroud. Furthermore, the electrode splicing work and furnace repair work requiring particularly long hours are mechanized so that they are carried out immediately after spouting and thus that the maintenance hours can be reduced greatly, leading to improvement of the productivity of the arc furnace.

In the first and second embodiments, various electrical parts and other devices are attached to the outside of the shroud surrounding the arc furnace so that the air inlet of the sound absorbing and insulating structure has its position of installation restricted, and normally only a single air inlet is installed at a proper position on the side wall. With such disposition of the air inlet, it is, of course, possible to prevent the inside of the shroud from falling into a negative pressure and also reduce nitrogen oxides $NO_x$. But, the air flow in the shroud is unidirectional so that heat is apt to stay in the shroud, tending to cause adverse effects on the equipments. Moreover, the inlet port has to be designed in a large size, resulting in higher cost.

Figure 19:
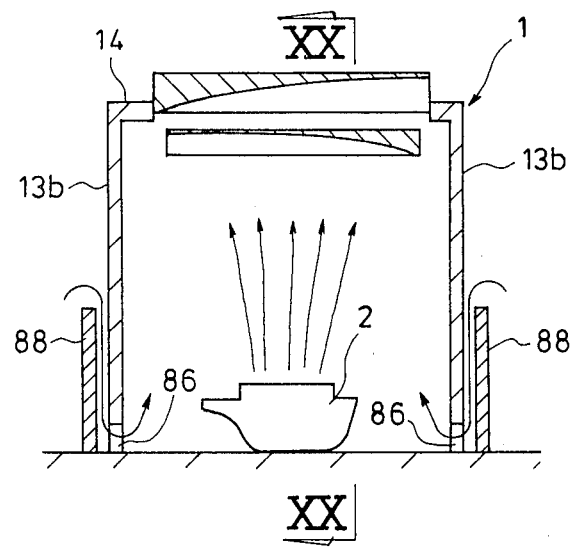
FIG. 19 is a sectional side view of a third embodiment of the steel making electric-arc furnace shroud of the present invention.
Figure 20:
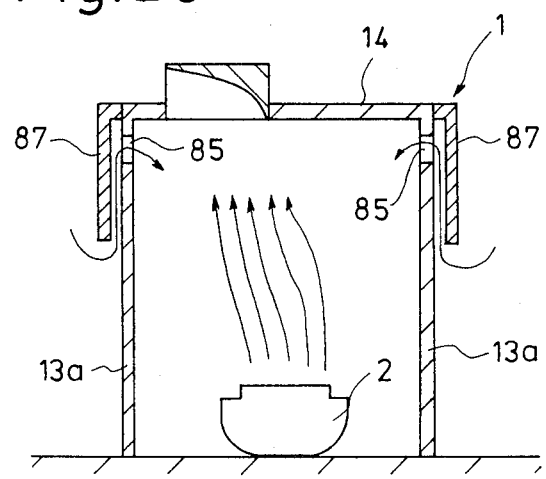
FIG. 20 is a sectional view taken along the lines XX—XX of FIG. 19.
Figure 21:
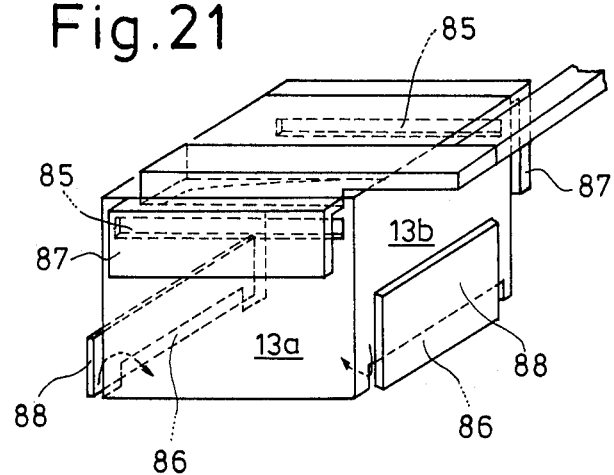
FIG. 21 is a perspective view of FIG. 19.

In the third embodiment of the present invention shown in FIGS. 19 through 21, the foregoing problems have been resolved. As seen, the side wall 13a has an air inlet 85 provided at an upper part, while the side wall 13b has an air inlet 86 provided at a lower part. For the air inlet 85, a sound absorbing wall 87 is drooped from the end part of the top wall 14 of the shroud 1, while for the air inlet 86, a sound absorbing wall 88 is projected from the floor.

The heat generated from the arc furnace main body 2 is carried into the dust collecting duct quickly by the air drawn in through the air inlets 85 and 86 on the side walls 13a and 13b. Consequently, the heat is not retained in the shroud but is discharged to the outside. Thus, it is enabled to protect the electrical parts and other devices fitted to the outside of the shroud 1 from the adverse effect of heat.

In each case of the first to third embodiments, gas spouts from the openings and gaps in the arc furnace main body in operation and spreads in the shroud. Then, part of the dust settles in the shroud, and it is difficult to collect the dust completely by the suction duct. Further, by the flame spouting from the opening through which the electrodes pass through the furnace cover, the electrode holder is damaged heavily, resulting in various troubles. Resolving such difficulty is the fourth embodiment of the present invention shown in FIG. 22.

Figure 22:
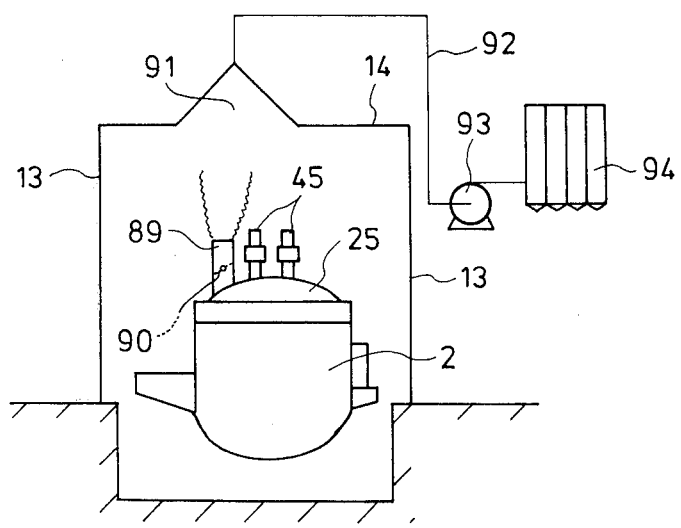
FIG. 22 is a sectional side view of a fourth embodiment of the steel making electric-arc furnace shroud of the present invention.

The furnace cover 25 shown in FIG. 22 has a smoke tube 89 provided, and said smoke tube 89 has a damper 90 provided for adjusting the discharge. Above the smoke tube 89 is provided a top hood 91 or an opening such as the suction duct shown in the first embodiment, and the top hood 91 or suction duct is connected to an exhaust duct 92 which is then connected across a fan 93 to a dust collecting device 94.

First, by driving the fan 93, the air in the shroud is withdrawn to the top hood or suction duct. The exhaust gas generated in the arc furnace main body 2 is drawn by the drafting effect of the smoke tube 89 and is discharged concentratively from said smoke tube 89. Here, discharge of the exhaust gas is adjustable by the damper 90 to an optimum quantity for the gas generated. Therefore, while spreading of the gas is prevented, the exhaust gas is collected by the hood 91 or suction duct. Further, the combustible components in the exhaust gas are burnt down as they come into contact with air at the point at which they are discharged out of the smoke tube 89, while the exhaust gas is mixed with and diluted by the surrounding air, thus having the temperature decreased, and is then drawn into the hood 91 or suction duct. While the draft effect of the smoke tube 89 is little, the arc furnace is operated under a positive pressure. Thus, various effects are expectable. For example, cold atmospheric air is not drawn into the furnace so that the quantity of exhaust gas from the arc furnace main body decreases. Also, because of smaller circulation of the gas, the thermal efficiency is improved, resulting in decrease of the consumption of electrical energy. Further, oxidative reaction of the electrode decreases, resulting in improvement of the consumption of electrode. Yields of the various auxiliary materials are improved. As the atmospheric air is not drawn into the furnace, generation of $NO_x$ is suppressed. Further, because of less wearing of the refractories in the furnace cover or more particularly, around the dust collecting port and the electrode opening, the consumption of refractories is improved.

In the first to fourth embodiments, it is imperative, for protecting the bag filter of the dust collecting device from damage of burning by high temperature exhaust gas exhausted from the arc furnace main body into the shroud and fed through the shroud, to reduce the temperature of exhaust gas at the exhaust gas inlet of the dust collecting device to a temperature below the allowable temperature for bag filter (for example, 120° C. in the case of polyester or 250° C. in the case of glass wool). For such purpose, it is customary to detect the exhaust gas temperature at the exhaust gas inlet of the dust collecting device by a thermometer and, when the exhaust gas temperature rises over the set temperature, open an air suction damper provided near the exhaust gas inlet of the dust collecting device to introduce external cool air and mix it with the high temperature exhaust gas to reduce the exhaust gas temperature below the set temperature. However, according to such system, when the air suction damper is opened, the exhaust gas withdrawn from the shroud has so much amount as that of air taken through the damper decreased so that the pressure inside the shroud is often brought to a positive side. In such case, the exhaust gas staying in the shroud is apt to leak out of the shroud through the gap between the top suction duct and the top door to the outside to degrade the work environment in the steel making mill greatly.

Here, as one of the methods of preventing leak of the exhaust gas, sealing the gap between the shroud and the top door is conceivable. However, such sealing mechanism is very expensive, and it is not economical to install such sealing mechanism solely to counter to the exhaust gas produced in a large quantity for only a short time. To reduce the exhaust gas temperature below the allowable temperature of the bag filter, it is considered to install a cooler for the exhaust gas. But, when such cooler is designed upon the quantity and temperature of the exhaust gas at peak hours, it has to be of a very large capacity and it not economical.

Figure 23:
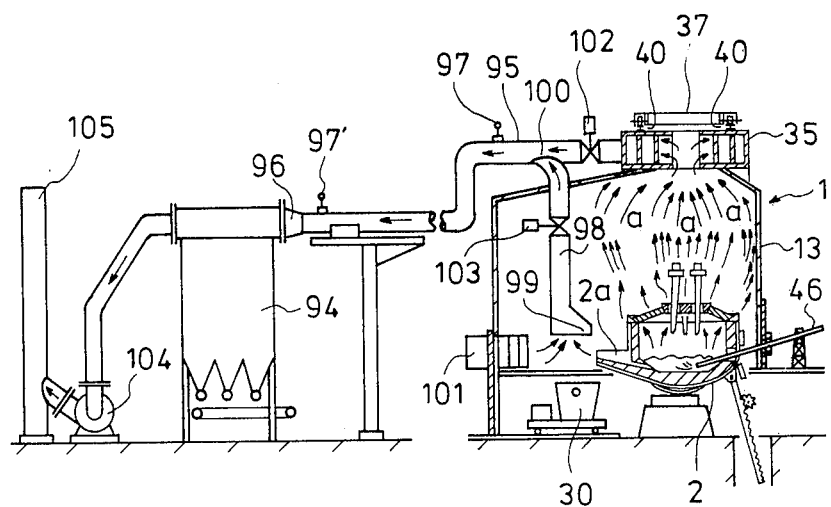
FIG. 23 is a side view partly in section of a fifth embodiment of the steel making electric-arc furnace shroud of the present invention.
Figure 24:
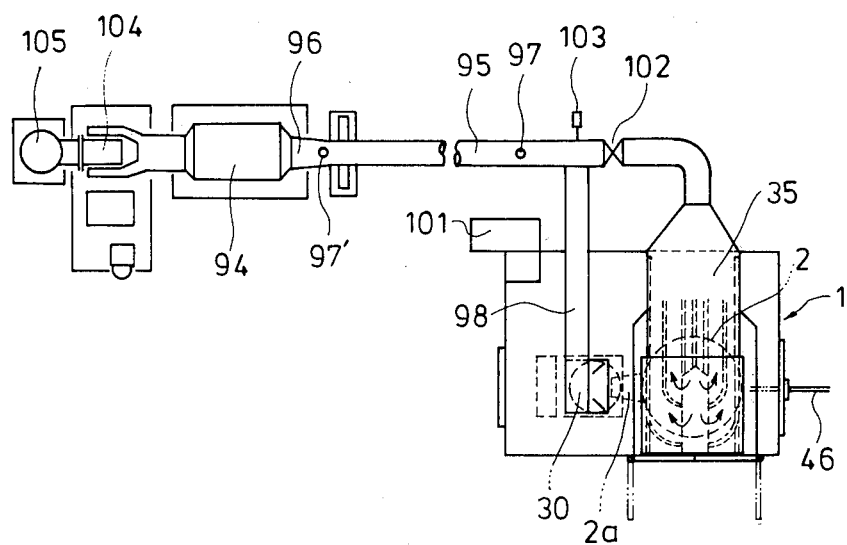
FIG. 24 is a plan view of FIG. 23.

The fifth embodiment shown in FIGS. 23 and 24 has the exhaust gas temperature reduced below the allowable temperature of bag filter with a simple and cheap construction.

An exhaust gas suction duct 95 having one end connected to the top suction duct 35 has its other end connected to the exhaust gas inlet 96 of a dust collecting device 94. In the dust collecting device 96 is housed a bag filter (not illustrated) composed of polyester or glass wool, while at appropriate locations in the exhaust gas suction duct 95 are provided gas temperature detectors 97 and 97'.

In the shroud 1, a low temperature gas suction duct 98 is so disposed that a hood 99 formed at its extreme end faces the spouting port 2a of the arc furnace 2, while the low temperature gas suction duct 98 has its other end connected to the exhaust gas suction duct at a joint 100. Further, in an opening provided at the lower part of the shroud 1 is provided an air inlet of sound absorbing and insulating construction so that cold air is taken into the shroud 1 from the outside, and the exhaust gas suction duct 95 and low temperature gas suction duct 98 have dampers 102 and 103 provided on the upstream side of the joint 100 respectively. Reference numeral 104 represents at induction fan; and 105, a stack.

The high temperature exhaust gas containing dust produced in a large quantity when the molten steel in the arc furnace 2 is oxygen blown by an oxygen lance 46, rises over the arc furnace 2 in a direction shown by arrow a into the suction duct 35 and is then introduced through the exhaust gas suction duct 95 into the dust collecting device 94. In order to maintain the temperature of the high temperature exhaust gas below the allowable temperature of bag filter (say, 120° C. if a polyester bag filter is used), the gas temperature detectors 97 and 97' are set at, say, 100° C. When the exhaust gas temperature exceeds this set value, the damper 102 provided in the high temperature gas suction duct 95 is reduced, while the damper 103 provided in the low temperature gas suction duct 98 is opened, so that cold air at the lower part of the shroud is drawn from the hood 99 of the low temperature gas suction duct 98 and is mixed with the exhaust gas to reduce the temperature of the exhaust gas. The cold air is taken into the shroud 1 through the air inlet 101 of the shroud. The opening of the damper 102 and that of the damper 103 are controlled by the differential temperature between the exhaust gas temperature at the exhaust gas inlet 96 of the dust collecting device and the set temperature. Should the exhaust gas temperature at the exhaust gas inlet 96 fail to fall below the allowable temperature of bag filter, the damper 102 is to be reduced greatly or nearly closed in an extreme case, while the damper 103 is to be opened fully to introduce cold air through the air inlet 101, and in this way, it is enabled to reduce the exhaust gas temperature at the exhaust gas inlet 96 exactly below the set value.

The total of the volumes of gas taken from the exhaust gas suction duct 95 and low temperature gas suction duct 98 is always equal to the volume of suction by the induction fan 104 of the dust collecting device 94, and in general, the capacity of the induction fan 104 is determined upon the volume of generated exhaust gas in commensuration with the oxygen blowing so that the internal pressure of the shroud 1 is always maintained on the negative side. When the damper 102 in the exhaust gas suction duct 95 is reduced, the exhaust gas stays at the upper part of the shroud. But, as the low temperature gas suction duct 98 takes in cold air in a volume equivalent to the capacity of the induction fan 104, the internal pressure of the shroud 1 maintains a negative pressure. When the internal pressure of the shroud 1 is negative, atmospheric air is taken in through the gap between the shroud 1 and the top door 37 so that the exhaust gas staying at the upper part of the shroud 1 scarcely leaks out into the mill.

In this embodiment, the low temperature gas suction duct also serves as a duct drawing and discharging the exhaust gas generated when the molted steel is spouted out of the arc furnace main body 2, so that the hood 99 is disposed close to the spouting port 2a of the arc furnace main body 2. But, where the low temperature gas suction duct 98 is not used for suction of the spouting exhaust gas, the duct 98 and hood 99 are not necessarily disposed as described above, but they are disposed at desired places in the shroud 1. As cold gas, cold air outside the shroud is used in the foregoing embodiment, but any other cold gas is usable. Further, a plurality of low temperature gas suction ducts may be installed. In this embodiment, the top suction duct 35 is formed separately from the shroud 1, but it will not be necessary to mention specifically that is may be formed integrally with the shroud 1 so long as it is so constructed as to be capable of taking in the exhaust gas generated from the arc furnace main body 2.

As described above, the internal pressure of the shroud is maintained on the negative side even if cold air is mixed to the exhaust gas so that an expensive additive structure such as cooler or top door sealing mechanism is not at all required, and it is enabled by a very simple construction to prevent leak of the exhaust gas out of the shroud and, at the same time, maintain the exhaust gas temperature below the allowable temperature for the bag filter.

Here, it should be noted that those reference numerals and symbols shown in the drawings of the foregoing embodiments which are the same with those shown in the drawings of the conventional cases, represent the same parts respectively.

It should also be understood that the present invention is not limited to the foregoing embodiments and is subject to various modifications so far as they do not diviate from the spirit of the invention.

Now, the features and effects of the steel making electric-arc furnace shroud constructed as has been described above in accordance with the present invention, will be summarized below.

(I) The opening through which the rope suspending the scrap bucket passes through the shroud when scraps are charged is so determined as to have a minimum width enough for the transversal movement of the suspending rope, and the suction port of the dust collection suction duct is so disposed as to surround said opening, so that the exhaust gas generated when the scraps are charged is drawn into the suction duct easily and thus that dissipation of the exhaust gas outside of the shroud is prevented effectively.

(II) While the electric-arc furnace is being operated, the opening of the minimum width for passage of the suspending rope is closed by the top door, while a slight gap is formed between the top door and the dust collecting suction duct through which atmospheric air is taken in, so that the exhaust gas is drawn into said suction duct and thus that the leak of the exhaust gas to the outside of the shroud is prevented.

(III) With a variety of maintenance equipments installed in the shroud, no consideration is required for maintenance such as designing the top door in a movable structure or providing a large top door and opening the space above the electric-arc furnace widely, so that the shroud is constructed solely for sound insulation and dust proofing for which it is initially intended.

Therefore, by providing, for example, a swing door in the side wall to allow the suspended scrap bucket to pass through and an opening of a minimum width enough for the scrap bucket suspender to be introduced and a top door closing said opening in the top wall, a shroud of outstanding sound insulating and dust proofing effects is provided.

Further, maintenance equipments, that is, top maintenance crane, spout maintenance crane, electrode splicer and hot furnace repair devices are installed, so that the maintenance works are carried out promptly and with ease.

Still further, the electrode splicing work and furnace repair work which are the regular maintenance works at the time of spouting are mechanized, so that these works are carried out in parallel and thus that the time from a spouting to the subsequent spouting is reduced greatly, leading to improvement of the productivity of the electric-arc furnace.

(IV) The air inlet having a sound absorbing and insulating effect prevents the heat being retained in the shroud and also the incidental equipments to the shroud being exposed to adverse effects of heat, and at the same time, it improves circulation of air in the shroud thus staying of hot air at the upper part due to a rising current of air being prevented positively.

(V) With the smoke tube provided, the exhaust gas does not spread from the shroud but is discharged intensively through the top suction port. Further, with no forced purging of gas made in the electric-arc furnace main body, furnace operation under a positive pressure is enabled, accompanying such advantages as improvement of the thermal efficiency of the furnace, of the electrode consumption of the yields of auxiliary materials and of the refractories consumption and prevention of generation of $NO_x$.

(VI) As one end of the low temperature gas suction duct is disposed in the shroud and the other end is connected to the exhaust gas suction duct which is in turn connected to the top suction port, the internal pressure of the shroud is maintained on the negative side even if cold air is mixed to the exhaust gas, so that no expensive additional structure such as gas cooler or top door seal mechanism is required and thus that by a very simple construction, it is enabled to prevent leak of the exhaust gas to the outside of the shroud and, at the same time, maintain the exhaust gas temperature below the temperature allowed for the bag filter.

What is claimed is:

1. In a shroud for a steel making electric-arc furnace comprising insulating and dust proofing walls surrounding sides and a top of a steel making electric-arc furnace main body, and doors provided in a side wall of said sound insulating and dust proofing walls to allow a scrap bucket which is suspended to pass through from the side; the improvement which comprises an opening provided in the top wall of said sound insulating and dust proofing walls, a dust collecting suction duct on the top wall covering said opening and having an opening therein in registry with the opening in the top wall, said openings being of a minimum width enough for a suspending device of said scrap bucket to move transversely to the center of said electric-arc furnace main body, said suction duct having its suction port in communication with said openings of minimum width, and a movable top door provided over said dust collecting suction duct and adapted to open or close said openings of minimum width.

2. An improvement according to claim 1 further comprising a maintenance equipment including transit rails provided beneath the top wall and extending from one of the opposing walls of the shroud to the other, at least one girder adapted to run over said rails, and at least one trolley carrier adapted to move transversely along said girder.

3. An improvement according to claim 2 further comprising a seal mechanism provided at one end of travelling of an overhead travelling crane in the shroud and covered tightly by a fixed heat insulating plate except an opening for inlet and outlet of said crane, said inlet and outlet opening being adapted to be closed by the crane by means of a closure fixed to a side of said crane and adapted seal a periphery of said closure.

4. An improvement according to claim 1, 2 or 3, further comprising an air inlet of sound absorbing and insulating structure provided in the side wall of the shroud.

5. An improvement according to claim 1, 2 or 3, further comprising exhaust gas processing means including an exhaust gas suction duct having one end connected to the dust collecting suction duct and the other end connected to a dust collecting device, an opening provided in the shroud and connected to a source of gas of lower temperature than the exhaust gas from said top, and at least one low temperature gas suction duct having one end disposed in the shroud and the other end connected to said exhaust gas suction duct.

6. An improvement according to claim 1, wherein discharge of exhaust gas is adjusted by a damper provided in a smoke tube for control of pressure within the furnace upon operation.

* * * * *